United States Patent [19]

Gibson et al.

[11] Patent Number: 4,530,258
[45] Date of Patent: Jul. 23, 1985

[54] SAW CHAIN SHARPENING METHOD AND APPARATUS

[75] Inventors: Duane M. Gibson, Milwaukie; Lewis A. Scott, Lake Oswego, both of Oreg.

[73] Assignee: Omark Industries, Inc., Portland, Oreg.

[21] Appl. No.: 489,869

[22] Filed: May 6, 1983

Related U.S. Application Data

[63] Continuation of Ser. No. 237,452, Feb. 23, 1981, abandoned, which is a continuation-in-part of Ser. No. 36,842, May 7, 1970, abandoned.

[51] Int. Cl.³ ............................................. B23D 63/00
[52] U.S. Cl. ................................................... 76/25 A
[58] Field of Search .................. 76/25 A; 51/382, 383

[56] References Cited

U.S. PATENT DOCUMENTS

| | | | |
|---|---|---|---|
| 2,729,987 | 1/1956 | Bluemink | 76/37 |
| 2,792,724 | 5/1957 | Durall | 76/40 |
| 2,824,468 | 2/1958 | Nielsen | 76/40 |
| 2,833,165 | 5/1958 | Irwin et al. | 76/31 |
| 3,040,602 | 6/1962 | Carlton | 76/38 |
| 3,189,064 | 6/1965 | Frederickson . | |
| 3,260,287 | 7/1966 | Oehrli . | |
| 3,263,717 | 8/1966 | Silvon . | |
| 3,313,184 | 4/1967 | Granberg | 76/31 |
| 3,435,860 | 4/1969 | Silvon . | |
| 3,457,969 | 7/1969 | Carter . | |
| 3,465,617 | 9/1969 | Silvon | 76/25 A |
| 3,465,795 | 9/1969 | Tupper . | |
| 3,469,610 | 9/1969 | Silvon . | |
| 3,487,591 | 1/1970 | Silvon . | |
| 3,516,459 | 6/1970 | Silvon . | |
| 3,526,156 | 9/1970 | Condon et al. | 76/25 A |
| 3,527,122 | 9/1970 | Oehrli | 76/37 |
| 3,529,495 | 9/1970 | Graversen | 76/25 A |
| 3,534,638 | 10/1970 | Van Ourkerk | 76/25 A |
| 3,545,508 | 12/1970 | Tupper . | |
| 3,581,785 | 6/1971 | Neumeier . | |
| 3,596,689 | 8/1971 | Oehrli . | |
| 3,603,179 | 9/1971 | Stihl et al. | 76/25 A |
| 3,889,556 | 6/1975 | Bain et al. | 76/25 A |
| 3,921,490 | 11/1975 | Dolata . | |
| 4,023,453 | 5/1977 | Dolata . | |

FOREIGN PATENT DOCUMENTS

455128  3/1949  Canada .
2940430  4/1981  Fed. Rep. of Germany .

Primary Examiner—James G. Smith
Attorney, Agent, or Firm—Klarquist, Sparkman, Campbell, Leigh & Whinston

[57] ABSTRACT

The specification discloses a completely outside sharpenable saw chain of the chisel type in which top plate portions are sharpened on their tops and in which side cutter portions are sharpened on their outer sides. The chain has allochiral cutter teeth each having a top plate portion sloping rearwardly and downwardly and joined along one side edge to a side slitter plate portion sloping rearwardly and inwardly, a bent over shank portion, a body portion and a depth gauge portion, the top plate portion, the side slitter plate portion and the shank portion being generally C-shaped. The top plate portion has at its top a sharpenable surface forming a top cutting edge which joins a corner chisel point from which extends downwardly and rearwardly a side slitting edge formed by a side plate sharpenable surface. The top plate portions are sharpened employing an attachment securable to the nose end of a saw bar around which the saw chain passes, the attachment carrying a flexible strip of abrasive material held against the saw chain top plate portions as a result of flexure of said strip. The attachment further includes a pair of side elements having abrasive surfaces spring biased against the side cutter portions.

49 Claims, 29 Drawing Figures

SAW CHAIN SHARPENING METHOD AND APPARATUS

CROSS-REFERENCE TO RELATED APPLICATION

This application is a continuation, of application Ser. No. 237,452, filed Feb. 23, 1981, which was a continuation-in-part of application Ser. No. 36,842, filed May 7, 1979, both abandoned.

BACKGROUND OF THE INVENTION

Saw chains having chisel-type cutter links, that is cutter links in which the top plate portion and the side slitter portion form a sharp angle, and, therefore, a sharp corner at the juncture of the top cutting edge and the side cutting edge, are very effective. However, they require expertise in sharpening and are not nearly so widely used as saw chains of the chipper-type which have a rounded corner formed by the top cutting edge and the side cutting edge, the rounded corner being less adapted to slitting than the sharp corner of the chisel-type teeth but being sharpenable without the great skill required by the chisel teeth. In each of Silvon U.S. Pat. Nos. 3,263,717 and 3,469,610, Oehrli U.S. Pat. No. 3,260,287 and Frederickson U.S. Pat. No. 3,189,064, there is disclosed a tooth adapted to have its top cutting edge sharpened uniformly with little skill required but the side slitter edge must be hand filed and this tooth does not present an easily maintained sharp corner. Neumeier U.S. Pat. No. 3,581,785 also shows top cutting teeth which can be sharpened easily but which have no side slitter portions. Dolata et al U.S. Pat. Nos. 3,921,490 and 4,023,453 disclose a saw chain having a twisted tooth which can be top sharpened and a side slitter which can be sharpened at the outside edge. However, both the top edge and the side slitting edge must include such large angles that they are not good cutters and a sharp corner is not provided. Also, such teeth break off easily.

Most top cutting edges can be sharpened employing an abrasive stone mounted adjacent the drive sprocket of a chain saw and movable radially inwardly against the chain, one example being illustrated in the aforementioned Oehrli U.S. Pat. No. 3,260,287. A grinding stone or the like can also be made elongated and arcuate whereby plural top cutting edges are sharpened as the chain passes around the sprocket, for example as illustrated in the aforementioned Dolata patents, in Carter U.S. Pat. No. 3,457,969, Silvon U.S. Pat. Nos. 3,435,860, 3,487,591 and 3,516,459, Condon et al U.S. Pat. No. 3,526,156 and Van Ourkerk U.S. Pat. No. 3,534,638. These devices are rather complex and expensive, and furthermore the sharpening stone is subject to wear and damage. Graversen U.S. Pat. No. 3,529,495 and Stihl et al U.S. Pat. No. 3,603,179 disclose curved backing plates or the like which support abrasive strip material adjacent the path of the cutter teeth. However, these devices tend to produce rapid wear or damage in the strip material when the same is urged toward the moving saw chain.

Also, the prior art does not disclose a satisfactory device for automatically sharpening cutter teeth with outer side sharpenable surfaces. Although Dolata U.S. Pat. No. 4,023,453 discloses sharpening a rounded corner, no means is disclosed for sharpening an outer side cutting edge of a chisel-type tooth having a sharp corner at the juncture of the side cutting edge and a top cutting edge.

OBJECTS

An object of the present invention is to provide an improved method and means for outside sharpening a chisel-type saw tooth.

Another object of the invention is to provide an improved apparatus for automatically sharpening outside sharpenable surfaces of a saw tooth.

Another object of the present invention is to provide an improved method and apparatus for economically sharpening saw cutter teeth.

A further object of the invention is to provide an improved method and apparatus for automatically sharpening top surfaces of saw cutter teeth utilizing inexpensive and replaceable abrasive strip material.

SUMMARY OF THE INVENTION

In accordance with the present invention, top sharpenable cutter teeth are sharpened by moving the cutter teeth along a predetermined path adjacent a flexible strip or web of abrasive material which has some stiffness, wherein the abrasive surface of the material is disposed in substantially parallel relation to the top sharpenable surfaces of the cutter teeth. The strip of abrasive material is longitudinally restrained at a given point out of contact with the cutter teeth and is flexed toward the cutter teeth to engage the top sharpenable surfaces thereof at a point downstream or along the direction of teeth travel from such given point. However, the strip of abrasive material is longitudinally unrestrained along said path farther downstream from the cutter teeth contact area and moreover the strip immediately adjacent the top surfaces of the cutter teeth is free to flex radially toward or away from said top surfaces. That is, the strip is not provided with a preformed backing device forcing the same into the teeth but rather the strip is urged toward the teeth in response to flexural resistance or restoring force of the strip itself. The strip may be flexed toward the cutter teeth by bending the same around an upstream support which also longitudinally restrains the strip, and/or by providing a downstream support which tends to curve or bend the strip of abrasive material around or against the path of the cutter teeth without forcing the strip into the cutter teeth immediately adjacent the area of contact with a backing member.

In accordance with another aspect of the present invention, side sharpenable cutter teeth surfaces are sharpened employing a pair of abrasive elements, one being located on each side of the longitudinal path or center line of the cutter teeth. The planar surfaces may be angled or canted somewhat to provide the cutter teeth with a side plate clearance angle. Ordinarily the cutter teeth top surfaces and side surfaces are sharpened simultaneously with an attachment embodying aspects of the present invention, said attachment suitably being removably securable to the nose end of a chain saw bar.

The means and method according to the present invention can be utilized for sharpening a completely outside sharpenable cutter tooth having a side plate portion sloping inwardly and rearwardly with its forward and side surface portion comprising a sharpenable surface forming a side slitting edge at the forward end of the inside face of the side plate portion. Such tooth also has a top plate portion sloping rearwardly and downwardly and joined to the upper edge of the side plate portion by a small radius corner, the forward and top surface portion of the top plate portion comprising a sharpenable surface and forming, with the bottom surface of the top plate portion, a top cutting edge providing a sharp point with the side slitting edge.

The subject matter which we regard as our invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DESCRIPTION

A completely outside sharpenable saw chain 10 (FIGS. 7 and 8) has novel top and side sharpenable chisel-type cutter links or teeth 11 and 12. The links 11 are identical to the links 12 except that the links 11 are righthand and the links 12 are lefthand, i.e. allochiral, and, hence, only the links 11 will be described in detail. Each link 11 (FIGS. 1-6) has a flat body portion 14, a depth gauge portion 16, an offsetting shank portion 18, a rearwardly, inwardly and somewhat downwardly sloping, generally flat or slightly rounded side plate portion 20 joined to the shank or offset portion 18 by a rounded, bent portion 22, and a rearwardly and downwardly sloping, flat, top plate portion 24 joined along one side edge thereof to the top edge of the side plate portion 20 by an angular or rounded, bent portion 26. The shank portion is joined to the body portion 14 by a rounded, bent portion 30. The body portion has holes 32 and 34 for rivets. Throughout this description and the claims, for purposes of clarity in describing the cutter links 11 and 12, it will be assumed that the body portions are in upright positions with the top plates uppermost. "Forwardly" means in the direction of chain travel, e.g. to the right in FIG. 2, while "rearwardly" refers to the opposite direction. Also, "inwardly" means toward the longitudinal center plane of the chain and "outwardly" means laterally away from the plane.

Figure 1:
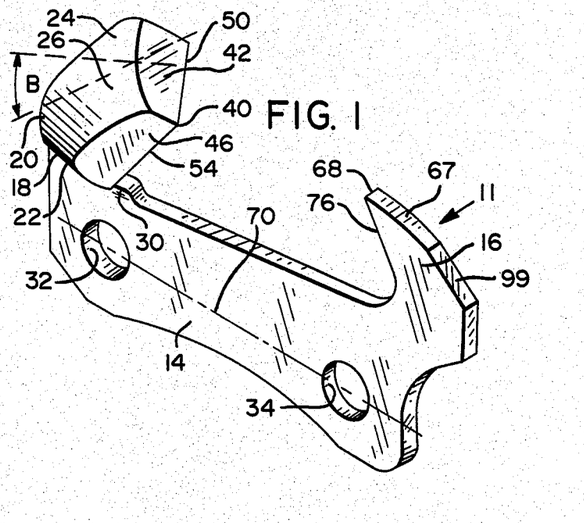
FIGS. 1 and 1a are perspective views of an improved chisel-type cutter link.
Figure 1A:
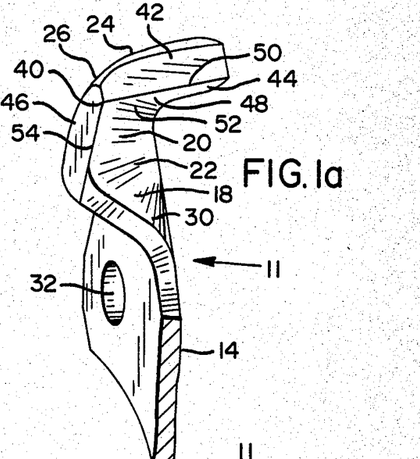
Figure 2:
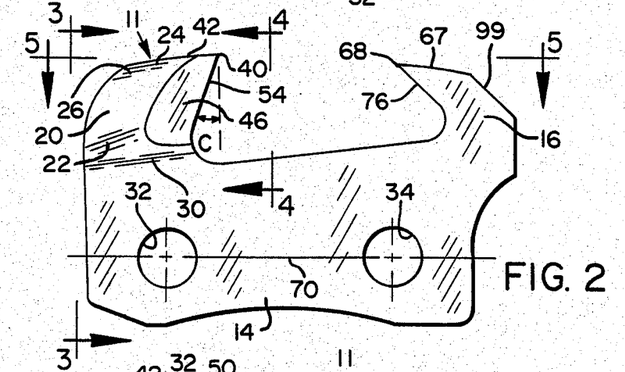
FIG. 2 is a side elevation view of the cutter link of FIG. 1.
Figure 3:
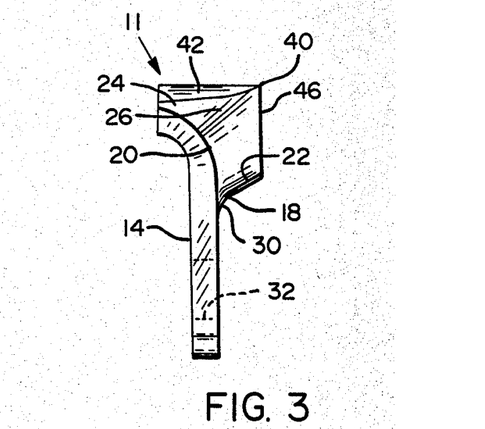
FIG. 3 is a rear view of the cutter link of FIG. 1 taken along line 3—3 of FIG. 2.
Figure 4:
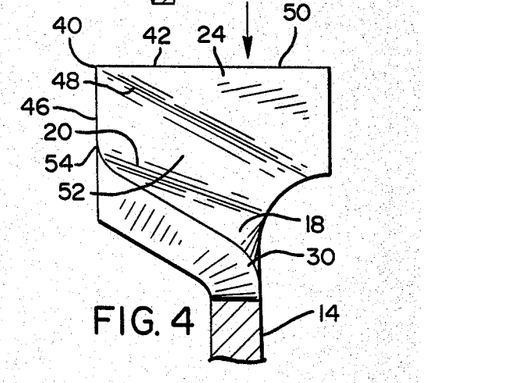
FIG. 4 is an enlarged, vertical, sectional view taken along line 4—4 of FIG. 2.
Figure 5:
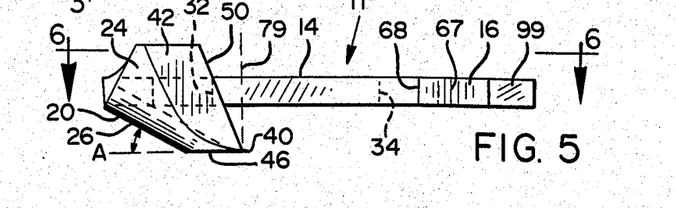
FIG. 5 is a top plan view taken along line 5—5 of FIG. 2.
Figure 6:
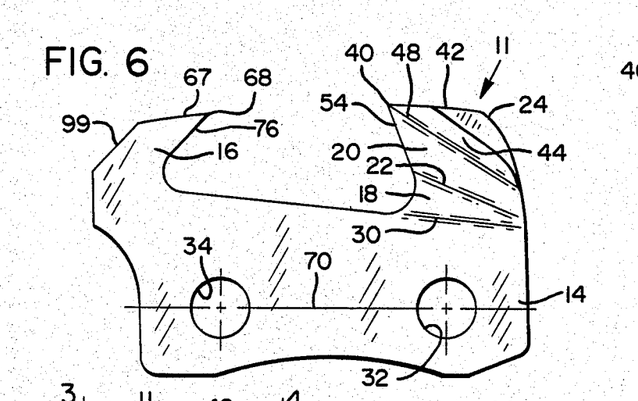
FIG. 6 is a side elevation view taken along line 6—6 of FIG. 5.

Each link 11 (and 12) has a sharp point 40 formed at the junction of a top sharpenable surface 42, an outer, planar side sharpenable surface 46 and an inner surface 48 preferably chrome, of the angular portion 26. An inner or bottom surface 44 of the top plate portion 24 is chromium plated and forms a sharp, rearwardly and inwardly extending top cutting edge 50 extending inwardly and somewhat rearwardly from the point 40. An inner surface or side 52 of the side plate portion 20 also preferably is chromium plated and forms a kerf side cutting edge 54, which extends somewhat downwardly, and preferably inwardly and somewhat rearwardly from the point 40 so that it is hook-like.

Figure 13:
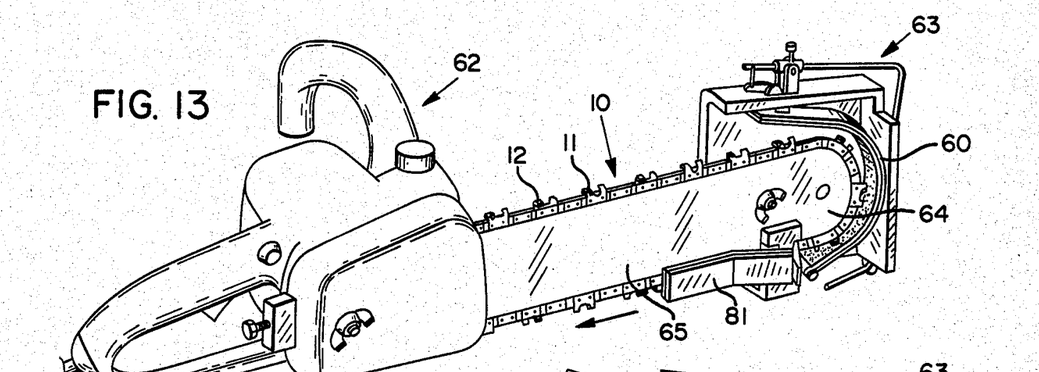
FIG. 13 is a perspective view of a chain saw with the saw chain of FIG. 7 and with a sharpening attachment mounted on a saw bar thereof.
Figure 14:
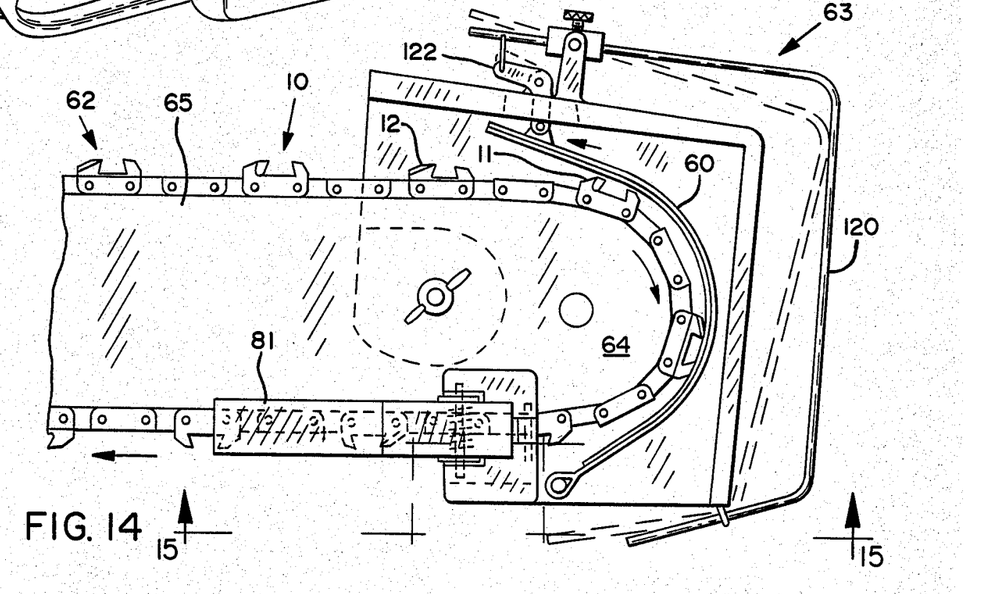
FIG. 14 is a fragmentary, side elevation view of the chain saw and sharpening attachment of FIG. 13.
Figure 15:
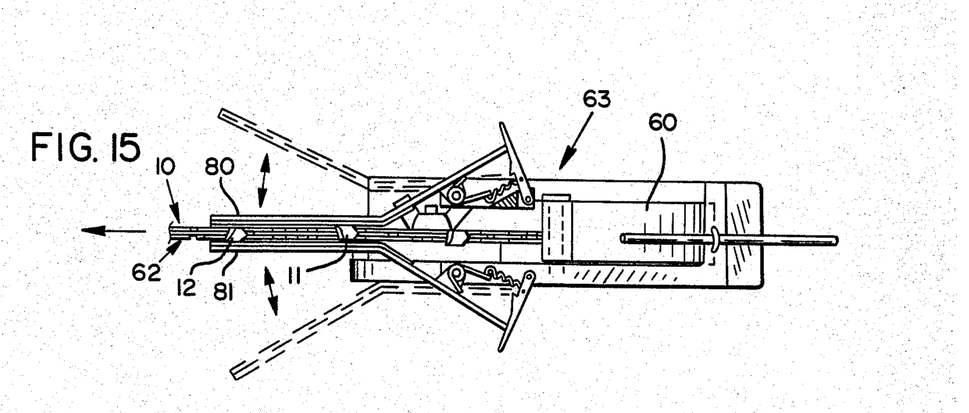
FIG. 15 is a bottom plan view taken along line 15—15 of FIG. 14.
Figure 16:
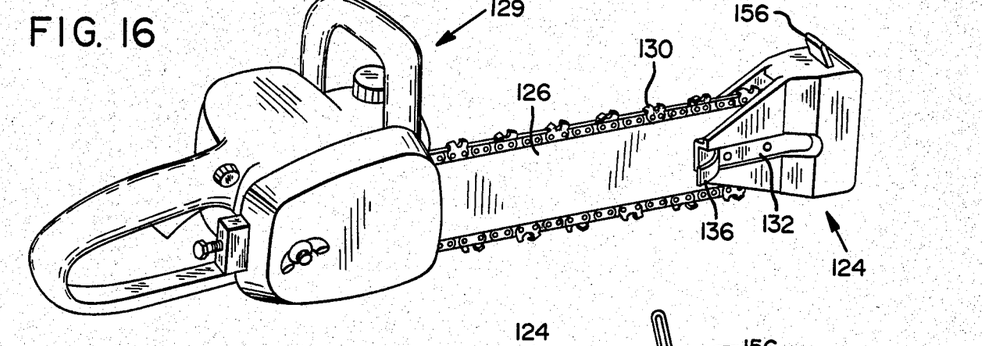
FIG. 16 is a perspective view of the chain saw with the saw chain of FIG. 7 and a second embodiment of a sharpening attachment mounted on the saw bar thereof.
Figure 17:
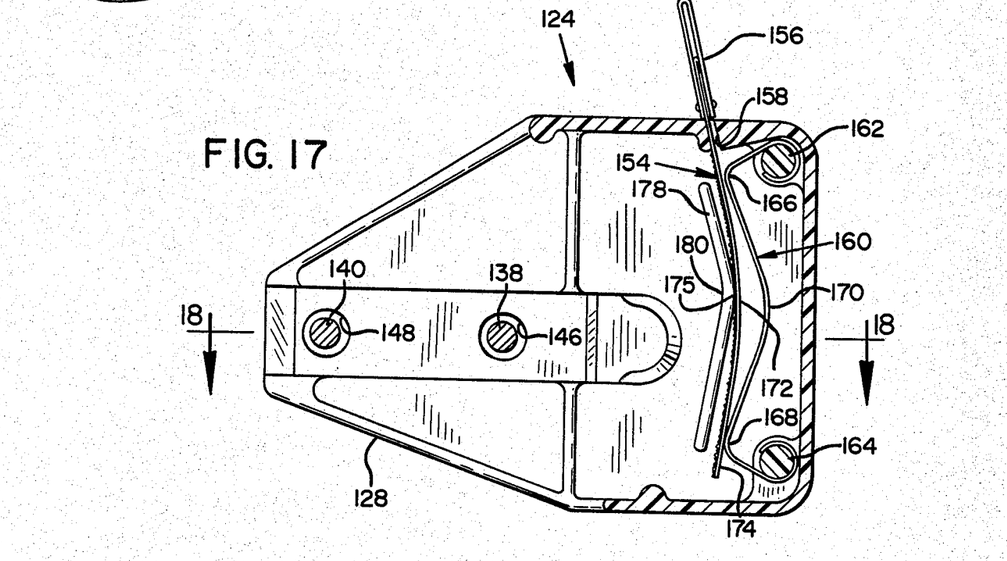
FIG. 17 is a more detailed cross-sectional view illustrating the attachment of the embodiment of FIG. 16, said cross-sectional view being taken at 17—17 in FIG. 18.
Figure 18:
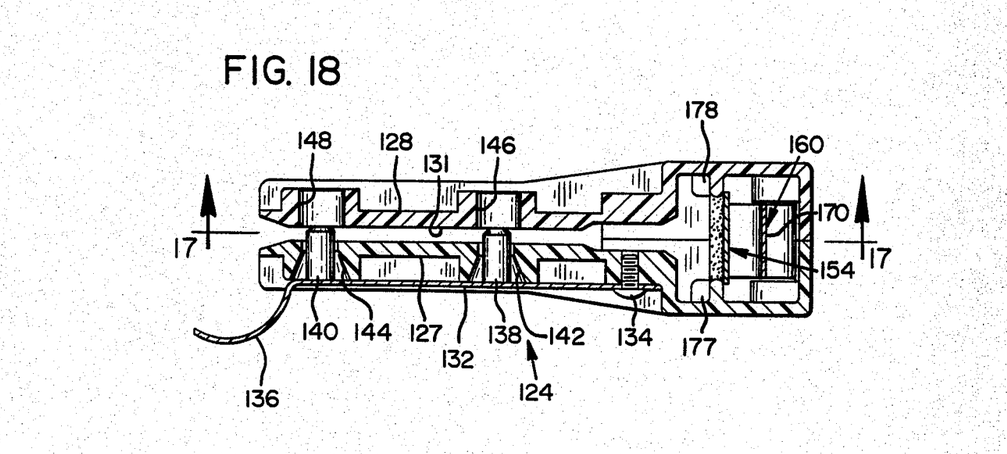
FIG. 18 is a transverse cross-sectional view of the latter attachment, being taken at 18—18 in FIG. 17.
Figure 19:
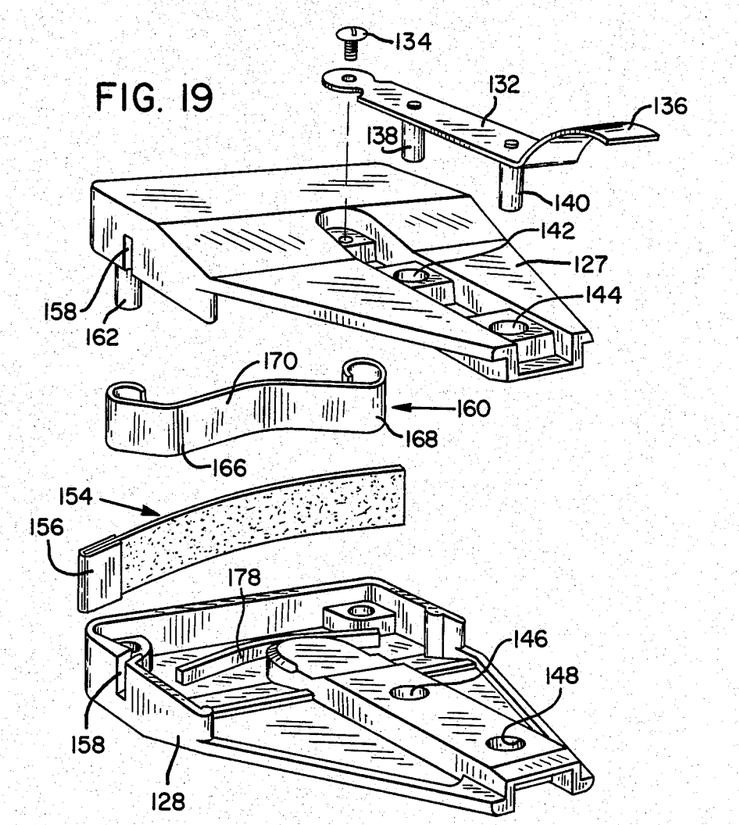
FIG. 19 is an exploded view of the sharpening attachment according to the second embodiment.

The cutting edges 50 are preferably sharpened by power, and may be sharpened by an arcuate abrasive member 60 (FIGS. 13-15) of a sharpening attachment 63 on a chain saw 62, when the member 60 is pressed toward a nose portion 64 of a saw bar 65 of the chain saw to always engage at least two of the top surfaces 42 as the chain is driven by a sprocket (not shown) of the saw. Arcuate abrasive member 60 is somewhat flexible, including a backing comprising a thin strip of spring metal or the like, and is placed in contact with the saw chain top surfaces by depressing bail 120 which raises crank 122 and draws member 60 to the left in FIG. 14.

Simultaneously, the member 60 also abrades top surfaces 67 of the depth gauge portions to reduce their height proportionately to the reduction of the height of the cutters by the sharpening. Rear end 68 (FIG. 2) of each depth gauge portion is the gauging portion thereof and is positioned substantially farther forwardly of the midpoint of an imaginary line 70 joining the centers of rivet holes 32 and 34 in the body portion than is the top cutting edge 50 to the rear of that midpoint. As a result, the rear end 68 of each depth gauge portion is always a selected distance lower than the cutting edge 50. The forward slope of rear edge 76 of the depth gauge portion 16 and the rearward slope of the bottom surface 44 of the top plate portion are such that the height differential between the rear end 68 and the cutting edge 50 is kept constant even after repeated sharpenings. Preferably, the downward slope of the top plate portion 24 relative to the horizontal (angle B) is from about 30° to about 40° such that the included angle of the cutting edge is from about 30° to about 40°. The top plate portion 24 slopes somewhat upwardly proceeding inwardly from the bent portion 26, to an extent such that the edge 50 forms an angle of about 22° with a line 79 (FIG. 5) normal to the plane of the body portion.

The kerf side cutting edges 54 of the side plate portions 20 of the links 11 and 12 are sharpened by pressing planar abrasive members 80 and 81 (FIGS. 13-15) against the sides of the saw chain 10 as the chain is driven by the chain saw to abrade the side sharpening surfaces 46 (FIGS. 1-6). It will be noted that planar abrasive members 80 and 81 are pivotally carried by sharpening attachment 63 and are spring biased against the side sharpening surfaces of the chain during sharpening operation. Members 80 and 81 can alternatively be latched out of sharpening position as shown by dashed lines in FIG. 15. The sharpening faces of the members 80 and 81 may be parallel to the body portions 14 of the cutter links 11 and 12 during sharpening, or, to increase the hooking configuration of the side cutting edges 54 and to provide some kerf side wall clearance, may be tilted preferably about 4°, somewhat inwardly proceeding upwardly as viewed in FIGS. 13 and 14. The surfaces 46 are, of course, planar. The inward slope of the side plate portions 20 is preferably such that the acuteness of the side cutting edges 54 is between 30° and 40°. This slope also permits many sharpenings of the side cutting edges without weakening the side plate portions.

Figures 9, 10, 11:
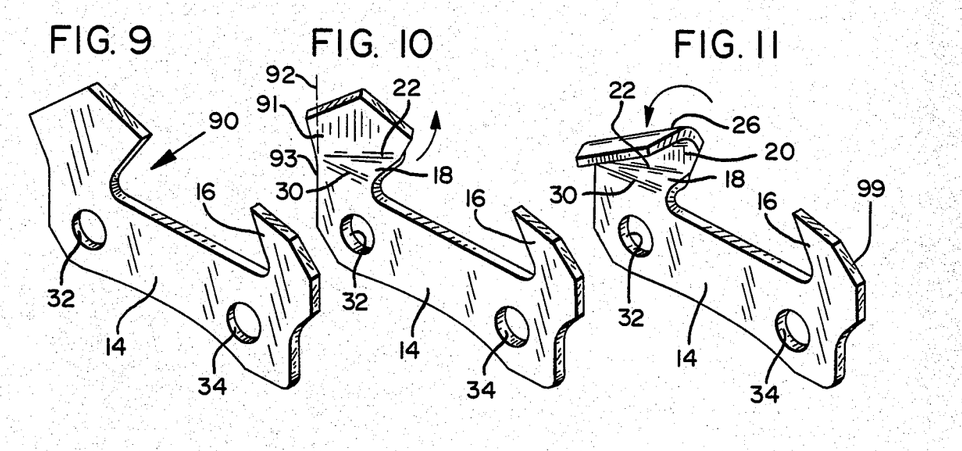
FIGS. 9-12 are perspective views of the several stages of making a cutter link like that of FIG. 1 but of the opposite hand.
Figure 12:
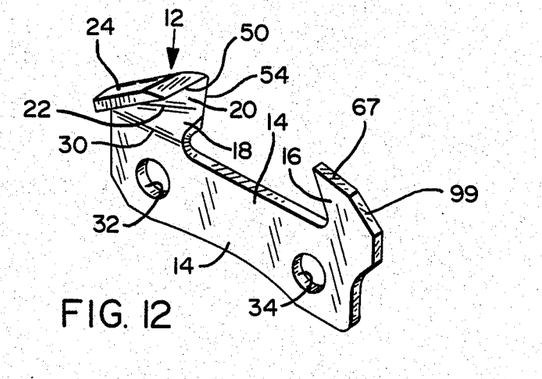

A preferred method of making the links 11 and 12 is to cut a blank 90 (FIG. 9) of sheet steel in soft condition, saw chain steel of about 0.043 inches thickness being one very satisfactory material, and then stretch form an upper portion 91 (FIG. 10) about a vertical axis 92 at back edge portion 93 to provide the offset shank portion 18. Then, with a wiping and slight coining action, the upper portion 91 is bent at rounded portion 26. This completes the shaping of the link and it is then heat treated to harden it to a Rockwell hardness of from about 50 to about 65 on the Rockwell Scale C, it being feasible to make the teeth even as hard as the 65, since filing is not required to sharpen the cutting edges 50 and 54.

After the hardening of the links 11 and 12, bottom face 48 of the top plate portion 24 and the inside face 52 of the side plate portion 20 are preferably plated with chromium to provide very hard, wear resistant material for the cutting edges 50 and 54. Also, during use of these cutter links, the hard chromium surface is pressed by the wood being cut against the top plate portion 24 and the side plate portion 20 so that there is no tendency to peel off the chromium plating.

The top plate portion, proceeding from the bent portion 26 at its outer edge, is tilted up somewhat so that the abrasion of the sharpening surface 42, which lies in a portion of a cylinder centered on an axis normal to the body portion 14, causes the cutting edge 50 to extend somewhat rearwardly proceeding from the corner or point 40. This gives the cutting edge a slicing as well as a chiseling action.

To provide the hook shape of the side cutting edge 54, the side plate portion 20 tilts out of a vertical plane proceeding downwardly from the upper bent portion 26 to the lower bent portion 22. Then, when the side sharpening surface 46 is ground in a substantially vertical plane, the side cutting edge 54 slopes somewhat rearwardly, proceeding downwardly therealong. This slope or hook is increased if the sharpening member is tilted inwardly at its lower end.

Figure 7:
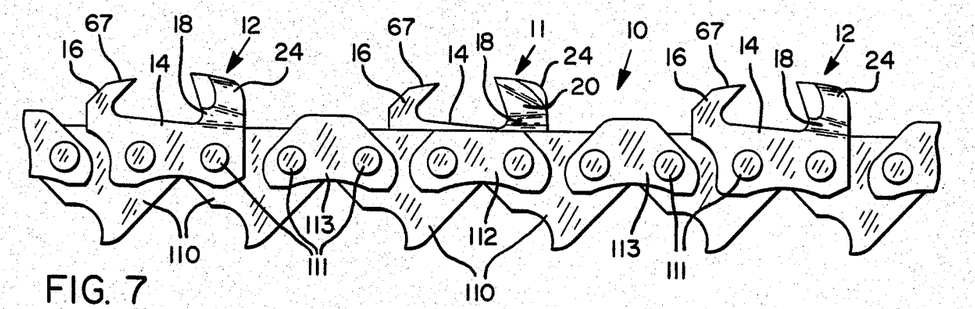
FIG. 7 is a fragmentary, side elevation view of an improved chisel-type saw chain, including the link of FIG. 1 and showing a sequence and a half of the saw chain.
Figure 8:
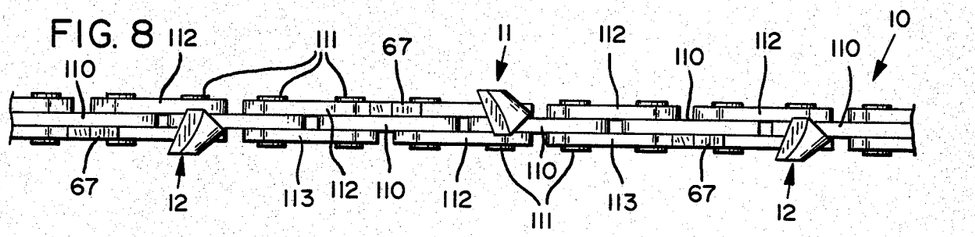
FIG. 8 is a fragmentary, top plan view of the saw chain of FIG. 7.

It will be understood that the chain 10 is endless and that only a segment, one and one-half sequences, is shown in FIG. 7. The chain 10 includes driving links 110 connected by rivets 111 to the body portions 14 of the cutter links 11 and 12 and side links 112, and also connected to bumper links 113 positioned between the cutter links. Each top plate portion 24 extends over the centerline of the chain so that the top plate portions 24 of the links 11 and 12 overlap one another.

The bent edge portion 26 at the juncture of the side plate portion 20 and the top plate portion 24 so extends inwardly and downwardly that, as the top sharpening surface 42 and the side sharpening surface 46 are sharpened substantially equally, the point 40 is maintained substantially at the center of the bent edge portion 48. The bent edge portions 22 and 26 extend in somewhat converging directions, proceeding rearwardly therealong, so that the side plate portion narrows somewhat from front to rear. The side plate portion 20 while shown as substantially planar may instead be somewhat rounded.

The cutter link 11 of a constructed saw chain which operated very successfully is shown with its geometry in FIGS. 1-6. The angle A of the side plate portion 20 to the plane of the body portion 14 proceeding rearwardly, or the angle of the side plate portion to the sharpenable surface, is about 30°. The side plate portion 20 tilts inwardly proceeding upwardly at an angle of about 10° to the vertical. The angle of the top cutting edge 50 relative to a line 79 normal to the body portion is 22°. The angle of the top plate portion 24 to the body portion 14 is 111°. The shank portion 18 is sloped at an angle of about 45° to the body portion 14. The angle C of the side cutting edge 54 relative to the vertical is about 22°. The thickness of the chromium plating on the lower face 44 of the top plate portion 24 and the inner face 52 of the side plate portion 20 is about 0.0004 inches. The link was hardened to a hardness of about 56 on the Rockwell C Scale. The side sharpenable surface 46 is disposed in a substantially vertical plane parallel to line 70 and body portion 14. A sloping forward corner portion 99 was provided on the depth gauge 16 to lessen the abrupt interference with wood being cut, particularly in boring.

The top plate portion 24, the side plate portion 20 and the shank portion 18, in transverse cross-section, are combined, concave and roughly in the form of a "C" having a combined concave inner surface which may vary from a substantially uniform curvature to being highly angled at the bent portions.

A method and apparatus for sharpening the cutter edges by power is further illustrated in FIGS. 16 through 20. A sharpening attachment 124 is mountable on the nose end of a saw bar 126 located at the forward end of chain saw 129, the chain saw being provided with an appropriate motor for driving saw chain 130 around the periphery of the bar. The saw chain 130 is suitably of the type illustrated in FIGS. 7 and 8 having cutter teeth with top sharpenable surfaces and outer side sharpenable surfaces as further illustrated at 42 and 46 in FIG. 20. The attachment 124 is generally U-shaped taking the form of a slotted case which slides over the end of the saw bar and comprises a pair of mating plastic side members 127 and 128 joined at their wider ends to provide an enclosure therebetween, while forming a saw bar receiving slot 131 between their narrower forward ends for fitting over the nose end of the saw bar. A spring detent mechanism 132, secured to member 127 by screw 134, extends longitudinally of member 127, terminating in an outwardly curved handle portion 136 adjacent the narrow end of the case. The detent mechanism carries pins 138 and 140 adapted to extend through apertures 142 and 144 in member 127 in alignment with apertures 146 and 148 in member 128. The pins are also receivable through holes 150 and 152 in saw bar 126 so as to removably secure the attachment 124 in sharpening position on the saw bar. The attachment is thus installed or released by moving handle 136 temporarily outwardly against the spring bias of the mechanism.

Figure 20:
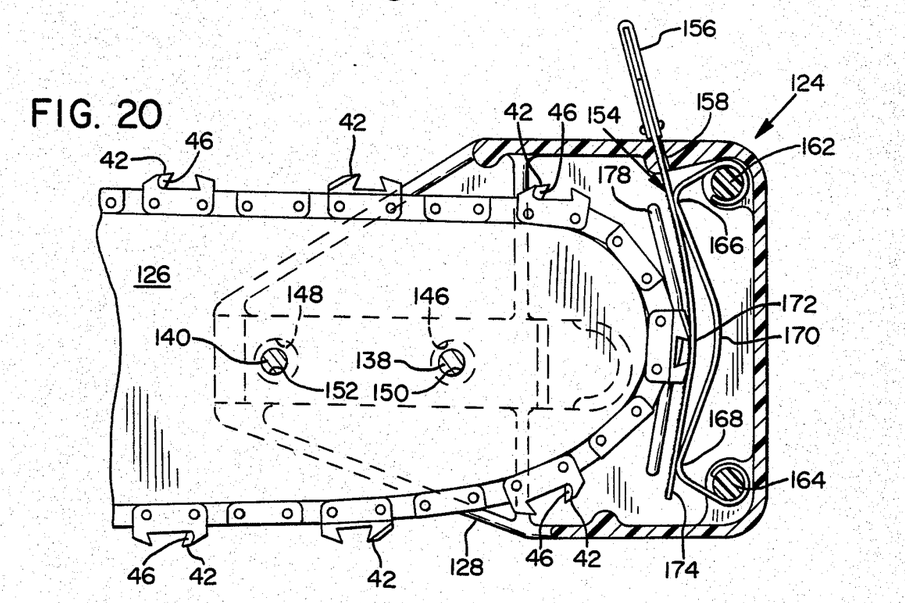
FIG. 20 is a side view, partially broken away and partially in cross section, illustrating in greater detail a saw bar with the attachment according to the second embodiment mounted thereon.

The attachment 124 comprises locating means for receiving and positioning a flexible abrasive member preferably in the form of a flexible strip or web 154 which is comparatively stiff but which can undergo flexing or bending into an arcuate shape. The attachment 124 positions the strip 154 adjacent the saw bar with the strip's abrasive surface 175 in generally parallel relation to the path of saw chain 130 as the saw chain traverses the saw bar 126, and, since the attachment 124 is preferably located at the nose end of the saw bar, the strip 154 is positioned adjacent a curved portion of the path of the saw chain. In particular, the strip is disposed in substantially normal relation to the long axis of the saw bar 126 but is curved somewhat around the saw chain path as illustrated in FIG. 20 with the abrasive surface facing the top sharpenable surfaces of the cutter teeth on the cutter links, as well as, of course, the depth gauges. The flexible strip 154 is flexed so as to bear against the top surfaces of the cutter teeth to sharpen the same, and in particular the attachment causes flexing or bending of the strip around the curved path of the teeth without substantially exceeding the elastic limit of the material. Therefore, the strip 154 follows around the curved path of the cutter teeth over a tangential contact area which may in some instances be somewhat limited in extent.

The strip 154 is longitudinally restrained and supported upstream of the direction of cutter teeth travel from the area of tangential contact with the cutter teeth for the purpose of restraining longitudinal movement of the strip. In the case of the embodiment being described, a narrow strip 154 is folded over and secured, and/or provided with a tab at one end as illustrated at 156, and is received into the case through a slot 158 which is somewhat slanted and orients the strip with a tangential attitude relative to the path of the saw chain.

The edges of the slot 158 act to engage the tab 156 and restrain the strip longitudinally, i.e. so the same will retain its position despite frictional movement of the saw chain thereagainst tending to urge the strip farther along the saw chain path.

The attachment 124 includes further supporting means for said strip in the form of a flat spring member 160 positioned rearwardly of strip 154, that is on the opposite side of the strip from the saw chain. The spring 160 is secured around posts 162 and 164 which are upstanding from side member 127 and received in matching sockets in opposite side member 128. Spring 160 extends from post 162 to a position 166 immediately to the rear of strip 154 and upstream from the contact area 172. At position 166 the spring is bent rearwardly where it provides support for the strip in conjunction with the edges of slot 158, for example when the attachment is located in place over a saw chain. Spring 160 also extends from lower post 164 to a second position or location 168 where the spring is bent rearwardly to support the strip 154 downstream from the area 172 of chain contact. A straight line between the first and second positions of support would intersect the path of the cutter top surfaces traversing around the saw bar. Consequently the strip 154 is flexed radially of the saw bar and exerts force radially inwardly against the cutter top surfaces for sharpening the same. The stiffness of the strip 154 and the rearward support thereof at locations 166 and 168 is such that strip 154 is stressed whereby the strip tends to restore itself to a non-bent or straight configuration and presses inwardly against the chain top sharpenable surfaces.

The spring 160 is bent away from said strip at 170 intermediate the positions 166 and 168, i.e. in the area where the strip contacts the chain, whereby the strip is free to flex and adjust to the contour of the saw chain surfaces. It is noted no stationary backing member or pressure plate is applied against the back of the strip in the area of chain contact as would force the strip between such plate and the sharpenable surface, and hence no tearing or breaking of the strip is produced.

The strip 154 is longitudinally unrestrained adjacent the path of the saw chain cutter teeth in a direction downstream of the direction of teeth travel from the contact area. Thus, in the present embodiment, leading end 174 of the strip is unrestrained longitudinally although being backed laterally by spring 160 at position 168. It has been found that longitudinal restraint of the web at a downstream point immediately adjacent the path of the cutter teeth can cause a bunching in the strip and the buildup of a frontal wave in the strip as a cutter tooth travels therealong in contact therewith. Such a wave tends to generate a negative slope at the cutting edge of a cutter tooth, tending to dull rather than sharpen the cutter. The longitudinal freedom of end 174 insures sharpening with a positive relief angle. Also, the clearance of spring 160 in the region 170 aids in preventing a negative slope at the cutting edge since a conventional abrasive backing member can produce a negative slope or the like unless contact between the cutter and the abrasive surface is very accurately controlled.

An abrasive strip track is provided on the inside walls of the attachment, said track comprising upraised ridges 177 and 178 on side members 127 and 128 respectively. These ridges are located adjacently along the strip 154, and along the path of the cutter teeth when the attachment is in place at the nose end of a saw bar. The ridges, however, have a somewhat short-radius curved region 180 adapted to contact the forward or abrasive side of strip 154, with the ridges flaring back from the strip 154 in more or less linear fashion at either side of region 180. These ridges urge the center of the strip 154 to the right (in FIG. 17) prior to the time the strip engages the saw chain, and prevent movement of the abrasive surface to an undesired extent toward the saw chain between cutter links. That is, the strip 154 is held out of the way of the saw chain except for the sharpenable surface and depth gauge portions thereof to prevent incorrect sharpening of the cutter edges as well as damage to the strip. The apices of ridges 177 and 178 are positioned at locations corresponding to the lowest sharpenable profile of a chain resulting after customary wear and sharpening over the lifetime of the chain.

The strip 154 suitably comprises a fabric backed abrasive web suitable for the removal of metal. The strip may be cut from conventional abrasive cloth material usually employed for abrasive disks and belts, metal polishing, cleaning, etc., and is fairly stiff, as hereinbefore mentioned, so that it tends to retain a flat orientation but can undergo flexing or bending without folding. However, a member other than a completely fabric backed abrasive strip can be similarly employed. For example, abrasive member 60 in the embodiment of FIG. 14 includes a thin strip of spring metal or the like as a backing layer which is sufficiently flexible to follow the contour of the sharpenable surfaces without imposing the rigidness or predetermined path of a conventional, stationary backing member. However, even in the case of the embodiment of FIG. 14, appreciable care needs to be taken in moving member 60 against the saw chain so as to prevent improper pressure and damage to the chain or the abrasive material. Consequently, the embodiment of FIGS. 16-20 and subsequent embodiments are preferred. Moreover, the construction of FIGS. 16-20 is quite economical and utilizes an economical and easily replaceable abrasive strip.

In use of the device of FIGS. 16-20, an abrasive strip 154 is inserted through slot 158 and the device is mounted on a saw bar by upraising handle 136 and sliding the device onto the end of the bar. The holes 146 and 148 are conveniently lined up visually with the matching holes 150 and 152 in the bar and the detent mechanism 132 is allowed to lock pins 138 and 140 into apertures 150 and 152. The saw motor is then operated at approximately one-third to one-half speed for approximately fifteen to twenty seconds for moving the top sharpenable surfaces against the abrasive surface for sharpening the cutting edge.

Referring to FIGS. 21-25, another embodiment of the present invention is illustrated comprising an attachment 182 mountable on the nose of saw bar 184, the latter being provided with a top sharpenable and side sharpenable chain 186. This embodiment is similar in many respects to the embodiment of FIGS. 16-20, for example in that the attachment 182 is substantially U-shaped and slides over the nose end of the saw bar where it can be secured in place. A chain saw motor (not shown) drives saw chain 186 against a flexible strip or web 188 of abrasive material disposed in generally parallel relation to the path of the saw chain. The strip 188 is preferably positioned adjacent the curved portion of the path of the saw chain, and, in particular, in substantially normal relation to the long axis of the saw bar 184.

The attachment 182 in this instance includes a U-shaped metal member 190 having parallel sides or legs 192 and 194 defining a slot therebetween for reception of the saw bar. Immediately adjacent the abrasive member 188, and therefore immediately adjacent the end of the saw bar, the attachment carries a pair of side elements 196 and 198 respectively adapted for sharpening the outer side sharpenable surfaces of saw chain 186. Farther from the flexible strip 188, the sides or legs 192 and 194 are displaced inwardly at 200 and 202, ending in inwardly directed tabs 204 which register with a hole 206 in the saw bar. The sides further include apertures 208 in the inwardly directed parts which receive a screw 210. Screw 210 is also receivable through a hole 212 in the saw bar and is secured with a wing nut 214. Thus, the attachment 182 can be installed at the nose end of the saw bar by spreading the sides thereof slightly and sliding the attachment along the saw bar until the tabs 204 engage hole 206. With holes 208 and 212 aligned, screw 210 is inserted therethrough and secured with wing nut 214.

Figure 21:
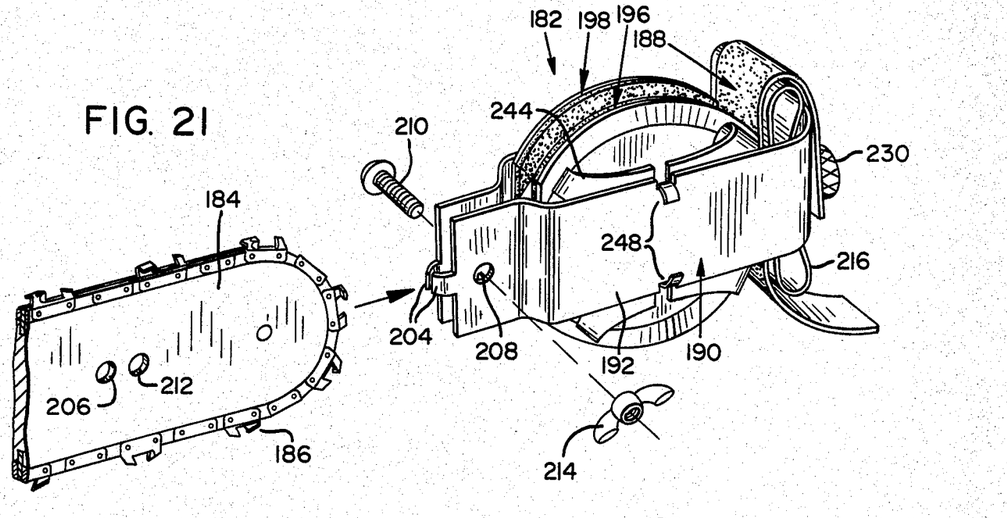
FIG. 21 is a perspective view, partially broken away, illustrating a third embodiment of a sharpening attachment and the saw bar upon which it is mountable.
Figure 22:
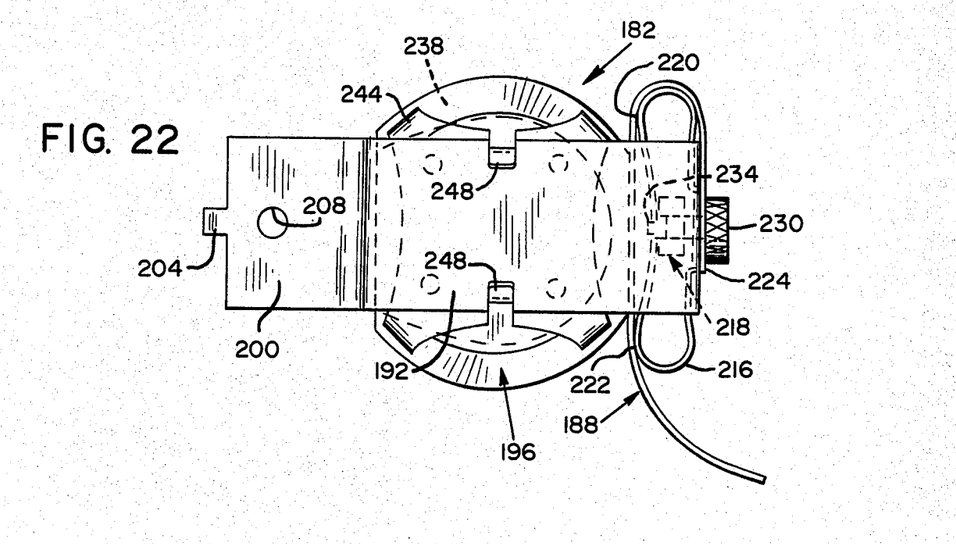
FIG. 22 is a side view of the FIG. 21 attachment.
Figure 23:
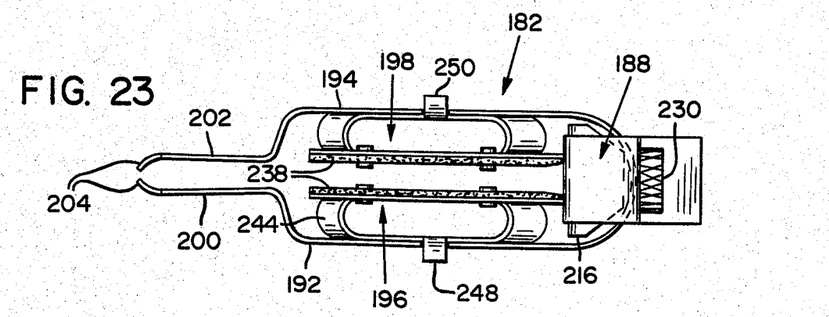
FIG. 23 is a top view of the attachment according to the third embodiment.
Figure 24:
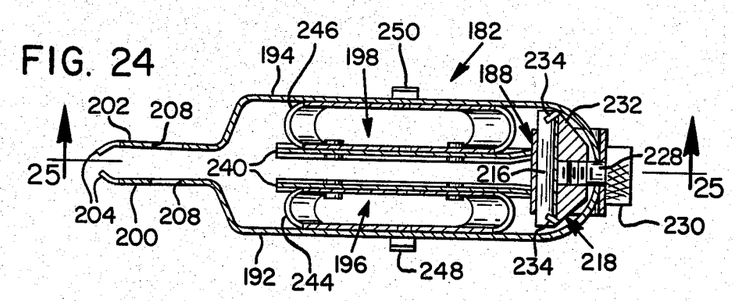
FIG. 24 is a transverse cross-sectional view of the attachment according to the third embodiment.
Figure 25:
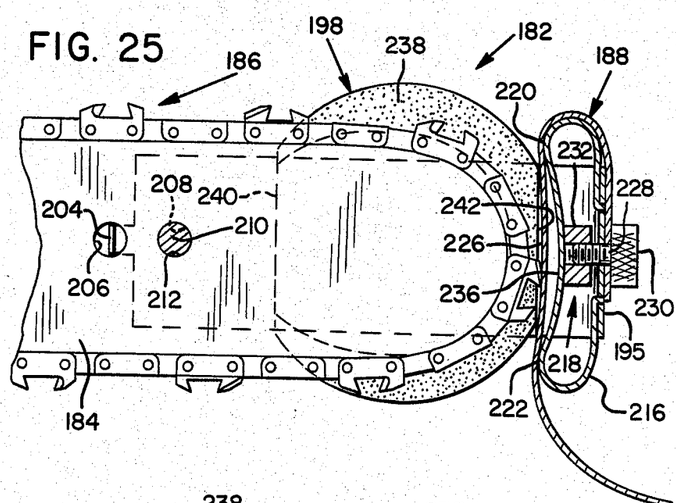
FIG. 25 is a side view, partially broken away and partially in cross section, illustrating in greater detail a sharpening attachment according to the third embodiment mounted on a saw bar, the cross-sectional portion being taken at 25—25 in FIG. 24.

The attachment 182 includes supporting means for strip 188 in the form of a curved metal platen 216, suitably comprising a flat spring member configured into a loop shape. The platen is curved at each end and drawn together centrally by mechanism 218 so as to provide a first or upstream location of support 220 and a second or downstream location of support 222 for flexible strip 188, the latter being curved around the upper end of the platen as illustrated in FIGS. 21, 22 and 25. Location 220 is upstream with reference to chain travel from the area 226 of contact between strip 188 and the chain, while location 222 is downstream therefrom. The rear or terminal ends of the platen are secured to the inside of end 195 of member 190 as illustrated in FIG. 25.

The mechanism 218 draws the platen 216 rearwardly away from the contact area 226, whereby the strip is free to flex and adjust to the contour of the saw chain surfaces. The mechanism 218 comprises a screw 228 having a knurled head 230 bearing against the curved end 195 of member 190, the screw being threadably received in a block 232 having tabs 234 which engage the forward side of the platen. Consequently, rotation of screw 228 is adapted to bow the platen and draw central portion 236 thereof rearwardly into a concave configuration. It is noted that no stationary backing member or pressure plate is applied against the back of the strip in the area of chain contact and consequently no tearing or breaking of the strip is produced. Adjustment of screw 228 by turning knurled head 230 can be employed to change support locations 220 and 222 slightly and thereby adjust the tension and position of strip 188.

The flexible strip 188 is secured to the platen by means of the knurled head 230 of screw 228, the shank of which passes through a hole near end 224 of strip 188. The strip 188 is curved around the upper end of the platen and then extends downwardly toward chain contact area 226, thus being longitudinally restrained by the platen upstream of the direction of chain travel from contact area 226 to prevent movement of the strip along the chain path. Moreover, the upper part of the platen restrains the plane of the strip with an attitude curving the strip away from the path of the cutter teeth, upstream of the contact area, for thereby causing the strip to flex toward the cutter teeth in the contact area. The flexural resistance or restoring force of the strip applies pressure against the saw chain top sharpenable surfaces without employing a conventional stationary backing member and without causing undesired damage to the strip. The lower end of the strip is unrestrained longitudinally along the path of the cutters, e.g. toward location 222, such that buildup of a frontal wave in the strip, as might generate a negative slope at the cutting edge of a cutter tooth, is avoided. Furthermore, the clearance of the platen in area 236 adjacent contact area 226 aids in preventing a negative slope at the cutting edge as could result from an improperly positioned backing member. Although flexural restoring force in the strip is produced in large part by the bending of the strip around the upper curved end of the platen and can be attained without the lateral constraint of the strip at location 222, the general shape of the platen prevents undesired movement of the strip away from the saw bar and adjustment of position 222 toward the strip can add tension as desired.

The flexible strip 188 suitably comprises the same type of material as strip 154 in the previous embodiment. Again, this material is comparatively stiff but can undergo flexing without folding or substantially exceeding the elastic limit thereof whereby the material itself is able to supply a restoring force which exerts sufficient pressure against the chain cutter teeth to sharpen the same.

Side elements 196 and 198 comprise detachable metal plates mounted on the insides of legs 192 and 194 of U-shaped metal member 190 and disposed adjacent saw chain 186. The plates are generally circular and substantially flat and each is provided with a peripheral area of abrasive material 238 on the inward side of the plate disposed in facing relation toward the side sharpenable surfaces of the cutter teeth for bearing thereagainst. Each abrasive surface extends along the curved path of the saw chain adjacent the curved end of the saw bar and contacts the cutter side sharpenable surfaces before and after the top sharpenable surface of the same tooth engages flexible strip 188.

The plates 196 and 198 have a radius slightly larger than the radius of the nose end of the saw bar but are positioned in generally concentric relation thereto. The plates are not completely round but are cut off along straight rear edges 240 which are perpendicular to the long axis of the saw bar, and along forward straight edges 242, also perpendicular to the long axis of the saw bar. Edges 242 are disposed adjacent strip 188 to accomplish the same function provided by the track 177, 178 in the prior embodiment, i.e. to restrain movement of the strip 188 farther than a predetermined distance in the direction of the cutter teeth so the strip will not become inserted between cutter teeth along the saw chain. The positioning of edge 242 is such as to allow for the maximum sharpening of the cutter teeth during the life of the chain.

Plates 196 and 198 are mounted on spider springs 244 and 246 which dispose the plates at each side of the device in inwardly facing relation toward the side sharpenable surfaces. The springs yieldably urge the abrasive surfaces of the plates into contacting relation with the side sharpenable surfaces and are sufficiently compliant to provide just sufficient force for sharpening the side surfaces at the same time the top surfaces are sharpened by strip 188. The springs 244, 246 are provided with tabs 248 and 250 adapted to be received in mating slots in legs 192 and 194 so the plates can be detached if it is desired that the device be used only for sharpening the top surfaces of the chain.

Figure 27:
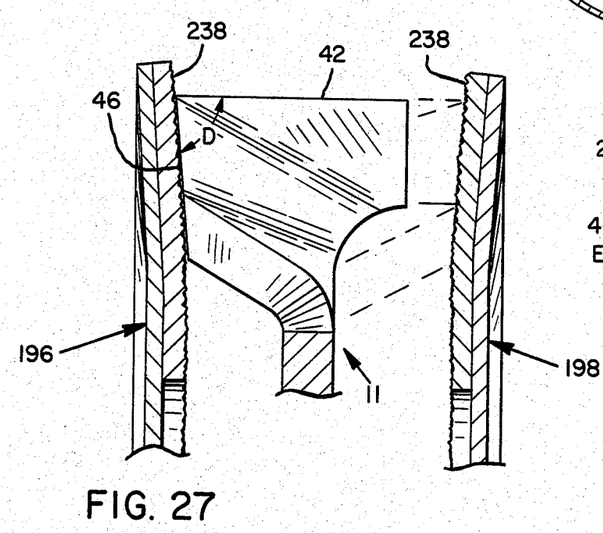
FIG. 27 is an enlarged explanatory view illustrating the canting of abrasive surfaces in the third embodiment to produce a side plate clearance angle on a saw tooth.
Figure 28:
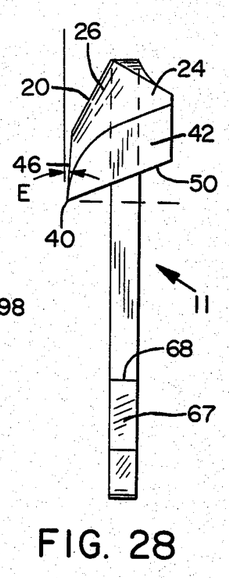
FIG. 28 is a top view of a link which has been sharpened employing the third embodiment and further illustrating a side plate clearance angle.

Although generally planar, the plates 196 and 198 are desirably contoured somewhat in the peripheral area of abrasive material 238 whereby the abrasive surface makes an acute angle with the top sharpenable surfaces of the cutter teeth along the path of the saw chain to provide a desired clearance angle. The abrasive surfaces bow backwardly or are canted toward the spring mounting means 244 and 246 respectively to present a somewhat convex surface toward the chain. FIGS. 27 and 28 illustrate the reason for this configuration. It will be seen that side sharpenable surface 46 of link 11 makes an angle D of less than 90° with top sharpenable surface 42 as a result of the contour or canting of the left-hand abrasive surface 238. Consequently, a vertical side plate clearance angle of about 4° is produced, said vertical side plate clearance angle equaling 90°-D. Since the top plate portion 24 slopes rearwardly and downwardly, the formation of a vertical side plate clearance angle also produces a horizontal side plate clearance angle indicated at E in FIG. 28. Thus, a desired horizontal relief angle is provided relative to point 40 by canting the abrasive surface 238 as illustrated.

The desired relief behind cutting edge 50 is provided in any of the embodiments because sharpening is carried out at the curved end of the saw bar with top sharpenable surface 42 forming part of a cylindrical surface of revolution having as its center the center of curvature at the nose end of the saw bar. Although sharpening at the curved nose end of the saw bar is preferred, an attachment according to the present invention may alternatively be employed at the opposite curved end of the saw bar, i.e. at the sprocket end.

Figure 26:
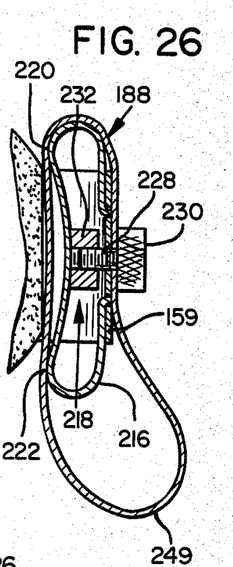
FIG. 26 is a partial cross-sectional view illustrating a variation of the sharpening attachment according to the third embodiment.

A variation of the third embodiment is illustrated in FIG. 26. According to this variation, strip 188 comprises a full, loosely formed belt loop provided therealong with an aperture for receiving the shank of screw 228. Sharpening contact between the strip 188 and the saw chain will automatically position the strip in the correct location for sharpening. The large free loop 249 which forms at the end in the direction of chain travel functions in the same manner as the non-constrained end of the strip in the embodiment of FIGS. 21–25.

The operation of the third embodiment is substantially the same as in the case of the embodiments hereinbefore described. That is, the attachment is placed on the nose end of the saw bar, with or without the side elements, and secured in place. The chain saw is then operated for a short time at low speed, as hereinbefore described, to accomplish sharpening.

In any of the embodiments disclosed it is clear that flexible means may be employed to sharpen top surfaces of cutter teeth without simultaneous sharpening of side surfaces, or alternatively, the disclosed side sharpening means may be employed to sharpen side surfaces of cutter teeth without simultaneously sharpening the cutter teeth top surfaces.

While we have shown and described several embodiments of our invention, it will be apparent to those skilled in the art that many changes and modifications may be made without departing from our invention in its broader aspects. We therefore intend the appended claims to cover all such changes and modifications as fall within the true spirit and scope of our invention.

We claim:

1. A sharpener for a saw device having a plurality of cutter teeth provided with top sharpenable surfaces and movable along a predetermined curved path, said sharpener comprising:
   a flexible abrasive member, and locating means mounted relative to said predetermined path for positioning said flexible abrasive member adjacent said path, said member having an abrasive surface disposed thereby generally along said path and facing the top sharpenable surfaces of said cutter teeth, support means on said locating means engaging said flexible abrasive member at spaced apart points and restraining said abrasive member such that it intercepts said path with said abrasive surface engaging the said top sharpenable surface of said cutter teeth, said flexible abrasive member being free of external support between said support means and being self-supporting therebetween whereby it is free to move toward and away from said path in the area of contact of said abrasive member with the cutter teeth top surfaces so that said member can assume the contour of the path of the cutter teeth top surfaces in said area of contact.

2. The sharpener according to claim 1 wherein said saw device is a chain saw including a saw bar around which a saw chain is driven defining said path, said chain including links provided with said cutter teeth, an wherein said sharpener comprises an attachment for application to a curved end of said saw bar adjacent a curved portion of the path of said saw chain, with said flexible abrasive member being flexed to curve around at least part of the curved portion of the path of said saw chain.

3. A sharpener for a chain saw including a saw bar around which a saw chain is driven, said saw chain including links provided with cutter teeth having top sharpenable surfaces and side sharpenable surfaces and movable along a predetermined path, said sharpener comprising:

an attachment for application to a curved end of said saw bar adjacent a curved portion of the path of the cutter teeth of the saw chain, said attachment including a flexible abrasive member, and locating means mounted relative to said predetermined path for positioning said flexible abrasive member adjacent said path, said member having an abrasive surface disposed thereby generally along said path and facing the top sharpenable surfaces of said cutter teeth, said flexible abrasive member being flexed to bear against said top surfaces of said cutter teeth while being otherwise unrestrained in an area of contact with the cutter teeth top surfaces, said flexible abrasive member being flexed to curve around at least part of the curved portion of the path of the cutter teeth of said saw chain, wherein said attachment is further provided with side sharpening elements disposed adjacent sides of said saw chain to sharpen said side sharpenable surfaces of said cutter teeth.

4. A sharpener for a saw having a plurality of cutter teeth provided with top sharpenable surfaces and movable along a predetermined path, said sharpener comprising:

locating means mounted relative to said predetermined path and a flexible strip of abrasive material positioned thereby adjacent said path, said strip having an abrasive surface disposed generally along said path and facing the top sharpenable surfaces of said cutter teeth to have an area of contact with the top surfaces of said cutter teeth moving along said path, strip support means on said locating means supporting said strip of abrasive material adjacent the opposite ends of sida area of contact, said strip being free of support between said strip support means whereby it may flex relative to the top surfaces of said cutter teeth toward and away from said path in said area of contact with said cutter teeth top surfaces so that said strip can assume the contour of the path of the cutter teeth top surfaces in said area of contact.

5. The sharpener according to claim 4 wherein said locating means includes means upstream of the direction of teeth travel from said area of contact for restraining movement of said strip longitudinally thereof.

6. The sharpener according to claim 5 wherein said upstream means includes means for restraining the plane of siad strip with an attitude causing said strip to curve away from said path for causing said strip in the region of contact to flex toward the cutter teeth.

7. The sharpener according to claim 5 wherein said strip is longitudinally unrestrained adjacent said strip in a direction downstream of the direction of teeth travel from said area of contact.

8. The sharpener according to claim 5 wherein said locating means also includes means downstream of the direction of teeth travel from said area of contact for cooperating with said upstream means to urge said strip against said cutter teeth and provide flexure, the path of said cutter teeth being curved between said downstream means and said upstream means.

9. A sharpener for a saw having a plurality of cutter teeth provided with top sharpenable surfaces and outwardly disposed side sharpenable surfaces and movable along a predetermined path, said sharpener comprising:

locating means mounted relative to said predetermined path and a flexible strip of abrasive material positioned thereby adjacent said path, said strip having an abrasive surface disposed generally along said path and facing the top sharpenable surfaces of said cutter teeth to have an area of contact with the top surfaces of said cutter teeth moving along said path, said strip of abrasive material being supported by said locating means to impart flexure to said strip relative to the top surfaces of said cutter teeth, said strip being unrestrained in an area of contact with the cutter teeth top surfaces except for the said flexure thereof, wherein said locating means is substantially U-shaped having opposed legs for positioning on respective sides of a saw structure and is provided with side sharpening elements at said legs for contacting and sharpening said outwardly disposed side sharpenable surfaces on the cutter teeth.

10. The sharpener according to claim 9 wherein said side sharpening elements comprise plates mounted on the insides of said legs by means of springs which urge said sharpening elements toward said cutter teeth.

11. A sharpener for a chain saw, said chain saw including a saw bar with a curved end, a saw chain entrained around the edge of said saw bar, and driving means for driving said chain around said bar, said saw chain having cutters with top sharpenable surfaces and outer side sharpenable surfaces, said sharpener comprising:

an attachment removably engageable with said saw bar, said attachment having end means for sharpening said top sharpenable surfaces as said chain is driven around said bar, and said attachment having side sharpening means for sharpening said outer side sharpenable surfaces, said side sharpening means facing inwardly at the edge of the saw bar toward the side sharpenable surfaces of a saw chain located therebetween and having abrasive surfaces for contacting said side sharpenable surfaces, said attachment including means for yieldably urging said side sharpening means toward said side sharpenable surfaces of said saw chain.

12. The sharpener according to claim 11 wherein said attachment includes a pair of legs extending over the sides of said saw bar for supporting said side elements against said saw chain therebetween.

13. A sharpener for a saw device having a plurality of cutter teeth with outer side sharpenable surfaces which are movable along a predetermined path, said sharpener comprising:

side sharpening elements for sharpening said outer side sharpenable surfaces of said cutter teeth, means for mounting said side sharpening elements at each side of said path and facing toward side sharpenable surfaces of the cutter teeth moving along said path, said side sharpening elements having inwardly, substantially planar abrasive surfaces for contacting said side sharpenable surfaces, and means for yieldably urging said side elements toward the side sharpenable surfaces of said cutter teeth.

14. The sharpener according to claim 13 wherein each said side sharpening element is contoured to provide a side sharpenable surface with a side plate clearance angle.

15. The sharpener according to claim 13 wherein each said side sharpening element has an abrasive surface making an acute angle with the top surfaces of cutters along said path of said cutter teeth.

16. A sharpener for a saw chain entrained on a saw bar, said saw chain having a plurality of cutter links provided with cutter teeth having top sharpenable surfaces and outer side sharpenable surfaces and which are movable along a predetermined path, said sharpener comprising:

side sharpening elements for sharpening said outer side sharpenable surfaces of said cutter teeth, means for mounting said side sharpening elements at each side of said path and facing toward side sharpenable surfaces of the cutter teeth moving along said path, said side sharpening elements having inwardly, substantially planar abrasive surfaces for contacting said side sharpenable surfaces, and means for yieldably urging said side elements toward the side sharpenable surfaces of said cutter teeth, said sharpener being located at a curved end of said saw bar and including end means for sharpening said top surfaces of said cutter teeth, each of said side sharpening elements having its abrasive surface extending along the curved path of the saw chain cutter teeth on the saw bar on either side of the curved end of the saw bar.

17. The sharpener according to claim 16 wherein said side sharpening elements comprise plates and said means for yieldably urging comprise springs on which said plates are mounted.

18. The sharpener according to claim 16 wherein said end means comprises a flexible strip of abrasive material flexed toward said top surfaces and wherein said side sharpening elements act to restrain said strip from moving toward said saw chain to points intermediate cutter links on said saw chain by more than a predetermined amount.

19. A sharpener for a chain saw, said chain saw including a saw bar with a curved end, a saw chain entrained around the edge of said saw bar, and driving means for driving said chain around said bar, said sharpener comprising:

an attachment removably engageable with said saw bar for receiving a strip of flexible abrasive material having an abrasive surface disposed by said attachment in generally parallel relation to the path of said chain and facing the top surfaces of cutters forming part of said saw chain, said attachment including strip supporting means for flexing said strip for causing the abrasive surface thereof to be urged radially inwardly of said saw bar in contacting relation with the top surfaces of said cutters of said chain, said strip being longitudinally restrained and supported upstream along said strip from an area of chain contact by said strip, said strip being unrestrained longitudinally forwardly along the path of chain travel from said contact area, the strip immediately adjacent the top surfaces of said cutters being free to flex radially toward the top surfaces of said cutters.

20. The sharpener according to claim 19 wherein said strip supporting means secures said strip so that said strip flexes against said saw chain.

21. The sharpener according to claim 19 wherein said means for supporting said strip comprises a platen around which the portion of the strip located opposite the direction of chain travel from said contact area is curved away from said saw bar for causing said strip to flex toward the saw chain in the region of contact of the strip with the top surfaces of the cutters.

22. The sharpener according to claim 21 wherein said platen comprises a flat spring member forming a loop around which said strip is curved and secured, said flat spring member at one end thereof being curved to define a first location of support, said flat spring member at the opposite end thereof being curved to define a position of support for said strip spaced along said strip in the direction of chain travel from said area of chain contact, said flat spring member being bent away from said web adjacent the area of chain contact so that said web is free to flex radially toward and away from the top surfaces of said cutters.

23. The sharpener according to claim 22 including means for adjustably shifting said spring member away from said strip intermediate said positions.

24. The sharpener according to claim 19 wherein said strip supporting means further supports said strip rearwardly at a position spaced along said strip in the direction of chain travel from said area of chain contact.

25. The sharpener according to claim 24 wherein said strip supporting means comprises spring means located on the rearward side of said strip from said saw chain for contacting said strip upstream and downstream from said area of chain contact.

26. The sharpener according to claim 25 wherein said spring means comprises a flat spring bent away from said strip adjacent said area of chain contact so that said strip is free to flex radially toward and away from the top surfaces of said cutters.

27. The sharpener according to claim 25 wherein said attachment comprises a slotted case slidable onto said saw bar, said case having means for attaching said spring means therewithin, and an aperture for receiving said strip into a position between said spring means and said saw bar, the edges of said aperture in said case acting to restrain said strip longitudinally.

28. The sharpener according to claim 27 including a track on inside walls of a said case for restraining said strip from flexing toward said saw chain to points intermediate cutter links on said saw chain by more than a predetermined amount.

29. The sharpener according to claim 27 wherein said slotted case is provided with a spring detent mechanism for removably attaching said case to said saw bar.

30. The sharpener according to claim 24 wherein a straight line extending from said position to the location of support upstream along the web from the area of chain contact intersects the path of the cutter top surfaces on said saw bar such that said strip is flexed to exert pressure against said cutter top surfaces.

31. The sharpener according to claim 30 further including means for restraining said strip from flexing toward said saw chain to points intermediate cutter links on said saw chain by more than a predetermined amount.

32. The sharpener according to claim 19 wherein said attachment is removably mountable on a said curved end of said saw bar.

33. The sharpener according to claim 19 wherein said attachment is substantially U-shaped having opposed legs for positioning on respective sides of said saw bar and is provided with side sharpening elements at the legs of the U-shape for contacting and sharpening outwardly disposed side sharpenable surfaces on the cutters of said saw chain.

34. The sharpener according to claim 33 wherein each said side sharpening element is contoured to provide a said side sharpenable surface with a side plate clearance angle.

35. The sharpener according to claim 34 wherein each said side sharpening element has an abrasive surface making an acute angle with the top surfaces of said cutters along the path of said saw chain.

36. The sharpener according to claim 35 wherein said sharpener is mountable at a curved end of said saw bar with said strip extending substantially normally to the long axis of said saw bar, each of said side sharpening elements having its abrasive surface extending along the curved path of the saw chain on the saw bar adjacent the curved end thereof.

37. The sharpener according to claim 36 wherein said side sharpening elements comprise plates mounted on the insides of the legs of the U-shaped attachment by means of springs.

38. The sharpener according to claim 37 wherein said plates are detachable from the legs of said attachment.

39. A sharpener for cutters movable in one direction in an arcuate path on a saw, said sharpener comprising means for mounting an elongate flexible abrasive strip adjacent the arcuate path of the cutters to engage and sharpen top, radially outwardly facing surfaces of the cutters at a contact region, said mounting means including means upstream from said contact region for restraining the strip against longitudinal movement in the direction of movement of a cutter, a pair of strip support members spaced apart upstream and downstream, respectively, along said path from said contact region and so positioned that a straight line connecting said support members defines a chord of said arcuate path to cause a portion of a strip extending therebetween and supported thereby to be urged into contact with said cutters at said contact region, there being no other support of said flexible strip between said members whereby said flexible strip is free to move toward and away from said path in the region of contact so that said strip can assume the contour of the path of said cutters in said region of contact.

40. A sharpener for cutters movable in one direction in an arcuate path on a saw, said sharpener comprising means for mounting an elongate flexible abrasive strip adjacent the arcuate path of the cutters to engage and sharpen top, radially outwardly facing surfaces of the cutters at a contact region, said mounting means including means upstream from said contact region for restraining the strip against longitudinal movement in the direction of movement of a cutter, a pair of strip support members spaced apart upstream and downstream, respectively along said path from said contact region and so positioned that a straight line connecting said support members defines a chord of said arcuate path to cause a portion of a strip extending therebetween and supported thereby to be urged into contact with said cutters at said contact region, said strip being otherwise unrestrained in the region of contact, and said strip being free of longitudinal restraint downstream in said path from said contact region.

41. A sharpener for cutters movable along a path in a saw, said cutters having laterally outwardly facing side sharpenable surfaces, said sharpener comprising:
   a mounting frame having a pair of laterally spaced portions defining a path through which cutters may pass,
   a pair of side sharpening surfaces mounted on said frame on opposite sides of said path to engage side sharpenable surfaces of said cutters moved through said path, and
   and biasing means yieldably urging said side sharpening surfaces inwardly toward said path to produce positive engagement of said side sharpening surfaces with side sharpenable surfaces of cutters moved along said path.

42. The method of sharpening cutter teeth having top sharpenable surfaces, said method comprising:
   moving said cutter teeth along a predetermined arcuate path,
   disposing a flexible strip of abrasive material adjacent said path with an abrasive surface thereof facing the path of the top surfaces of said cutter teeth,
   longitudinally restraining said strip at a given point adjacent said path,
   and at a second point spaced from said given point applying a force to said strip to cause said strip to be urged toward said path thereby to engage the top surfaces of said teeth over an area of contact with said strip, and while applying said force applying no external restraint to said strip in said area of contact whereby said strip is free to flex toward and away from said top surfaces.

43. The method of sharpening cutter teeth having top sharpenable surfaces and outer side sharpenable surfaces, said method comprising:
   moving said cutter teeth along a predetermined path,
   disposing a flexible strip of abrasive material adjacent said path with an abrasive surface thereof generally parallel to the top surfaces of said cutter teeth, longitudinally restraining said strip at a given point,
flexing said strip relative to said cutter teeth to engage the top surfaces thereof along the direction of teeth travel from said given point,
and simultaneously sharpening outer side sharpenable surfaces of said cutter teeth by disposing substantially planar abrasive surfaces against the outer sides of said cutter teeth moving along said path.

44. The method according to claim 43 including canting said substantially planar abrasive surfaces inwardly toward the bottom of said side sharpenable surfaces to provide said cutter teeth with a side plate clearance angle.

45. The mthod according to claim 42 wherein said strip is flexed toward said cutter teeth by curving said strip away from said cutter teeth proximate said given point.

46. The method according to claim 42 including flexing said strip by curving said strip toward the path of said cutter teeth downstream of the direction of teeth travel from where said strip engages the top surfaces of said cutter teeth, wherein said path of said cutter teeth curves away from the otherwise extended position of said strip downstream from where said strip engages said cutter teeth.

47. The method according to claim 42 including limiting flexure of said strip toward said cutter teeth to prevent substantial movement of said strip between cutter teeth along said path.

48. The method according to claim 42 including moving said cutter teeth along a curved path to provide relief back of the forward cutting edges of said top sharpenable surfaces.

49. The method of sharpening cutter teeth having outer side sharpenable surfaces on side plates, and rearwardly and downwardly sloping surfaces on top plates, said method comprising:
moving said cutter teeth along a predetermined path,
disposing abrasive surfaces against the outer side sharpenable surfaces of said cutter teeth moving along said path,
and canting said abrasive surfaces inwardly toward the bottom of said side sharpenable surfaces to provide said cutter teeth with vertical and horizontal side plate clearance angles.

* * * * *